United States Patent [19]
Bolger et al.

[11] 4,122,489
[45] Oct. 24, 1978

[54] SIGNAL DEFECT COMPENSATOR

[75] Inventors: Thomas Vincent Bolger, Pennsauken; Robert Adams Dischert, Burlington, both of N.J.

[73] Assignee: RCA Corporation, New York, N.Y.

[21] Appl. No.: 780,333

[22] Filed: Mar. 23, 1977

[30] Foreign Application Priority Data

Nov. 15, 1976 [GB] United Kingdom ............... 47548/76

[51] Int. Cl.² .................. H04N 5/78; H04N 9/535
[52] U.S. Cl. ................................. 358/21; 358/8; 360/38
[58] Field of Search ............ 358/8, 21, 160, 36; 360/38

[56] References Cited

U.S. PATENT DOCUMENTS

| 3,586,762 | 6/1971 | Hodge et al. | 358/8 |
| 3,949,416 | 4/1976 | Stalley et al. | 360/38 |
| 4,021,852 | 5/1977 | Hurst et al. | 358/8 |

Primary Examiner—John C. Martin
Attorney, Agent, or Firm—Eugene M. Whitacre; Paul J. Rasmussen; Robert L. Troike

[57] ABSTRACT

A signal defect compensator is provided which develops a replacement video signal for use during a signal dropout. The replacement video comprises video image information from the horizontal lines both before and after the line on which the dropout occurs, the replacement video being obtained by summing video from a current scanning line with video from a channel including a 2H delay, the video channel further including means for insuring the chroma portion of the replacement video being of the proper phase.

3 Claims, 6 Drawing Figures

SIGNAL DEFECT COMPENSATOR

BACKGROUND OF THE INVENTION

This invention relates to a signal defect compensator which may be used in a system for reproducing recorded television image information.

In the reproduction of television video signals from information recorded, for example, on magnetic tape, magnetic discs or other types of recording media, a decrease or loss of the recorded signal information may be encountered, which is apparent to the viewer as a degraded picture. A principle form of such a defect is known as a dropout which may occur due to imperfections in the recording media or an accumulation of dirt or other debris at the junction where the playback/recording heads and the media meet. When such a dropout occurs, the signal recovered from the media generally suffers a sharp reduction in amplitude which appears in the picture seen by the viewer as random black and white streaks or flashes on the screen of the television receiver or other means utilized as a reproducer. In severe cases, such a dropout may occur for one or more entire lines of the television picture.

Since it is known that television image information is to some extent redundant from line to line, dropout compensators (DOC) have generally operated on the principle that since the image information is redundant from line to line, it is possible to compensate for a dropout by substituting information from a previous image line during the duration of the dropout. Known defect compensators, as shown in U.S. Pat. No. 2,996,576, therefore, store image information from a previous line and insert the stored previous line information into the output video signal when a signal dropout occurs. Such a direct replacement is generally satisfactory for a monochrome video signal; however, in the case of a color video signal, a direct replacement from the previous line is not satisfactory since the phase relationship between scanning sync and color sync (burst in the NTSC system) differs on adjacent lines of a television picture. The scanning sync pulses are in-phase from line to line, but the color sync (burst) is interlaced or 180° out-of-phase from line to line. If a direct replacement signal from the previous line storage is attempted, the color signals will be inverted, and the replacement appears on the reproduced picture as complementary to the true colors. This affect is particularly disturbing to the viewer if the dropout exists for any appreciable portion of a television line. Therefore, in a color dropout compensating circuit, as shown in U.S. Pat. No. 3,463,874, the stored image information is separated by a low pass filter into a luminance portion containing substantially all the frequencies below 2.5 MHz and by a bandpass filter into a chrominance portion containing substantially all the frequencies from 2 to 4 MHz. The chrominance portion is passed through an inverting signal processor and then recombined with the luminance portion so that the color phasing is correct when the stored video is utilized as replacement video during a dropout.

SUMMARY OF THE INVENTION

A video signal processing system is provided for dropout compensation of a color video signal by substituting a replacement color signal for the color video signal during the period of the dropout. The replacement signal consists of video information from the television lines before and after said dropout. The system comprises first delay means responsive to a source of video signals for delaying the video signals by at least one television line to provide a first information signal. Second delay means coupled to the first delay means so that the first and second delay means are responsive to the video signals for delaying the video signals by at least two television lines to provide a second information signal. First combining means are responsive to the video signals and the second information signal to provide a third information signal at a line time intermediate the video signals and the second information signals. Signal processing means responsive to the third information signal for developing a replacement signal equal in subcarrier phasing to the first information signal. Switch means coupled to the first information signal and the second video output signal being responsive to a dropout signal for substituting one of the first information signal or the second video output signals for the other in the presence of the dropout signal.

DESCRIPTION OF THE INVENTION

Figure 1:
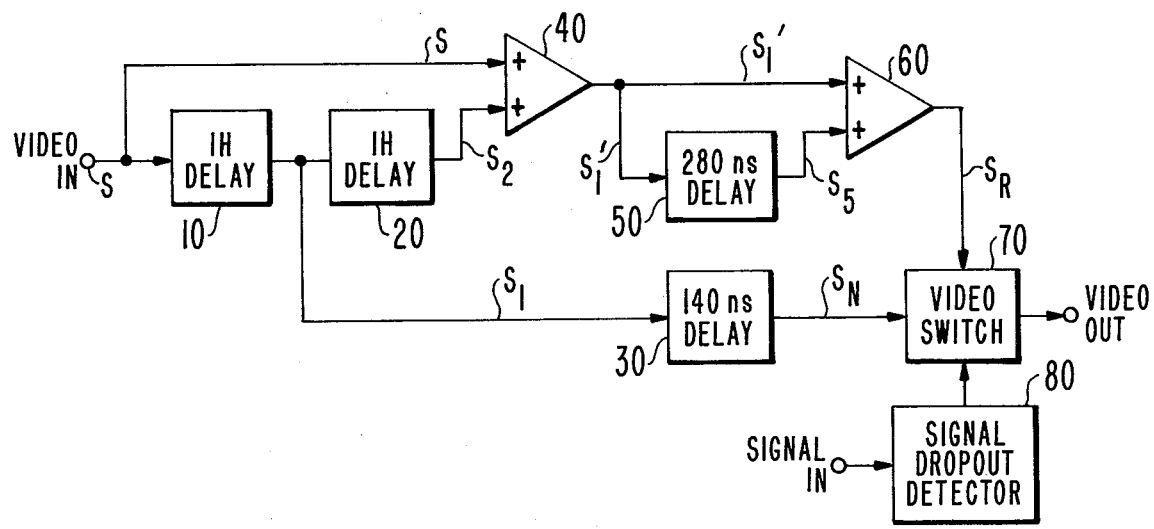
FIG. 1 is a block diagram of an analog system embodying the present invention.

In FIG. 1, a source of video signals, for example from a video tape recorder (VTR), are coupled to the input terminal of a 1H delay line 10 and to one input terminal of a summing amplifier 40. The 1H delay lines 10, 20 and the 140 and 280 nanosecond delay lines 30 and 50 may be constructed in the form known as a glass delay line of conventional design and capable of providing a delay, for example, in delay line 10 of 63.5 microseconds which is equivalent to a signal input delay of one horizontal television line in the NTSC system standards. The output terminal of 1H delay line 10 is coupled, in turn, to the input terminal of a second delay line 20 and to the input terminal of a 140 nanosecond delay line 30. The output terminal of delay line 30 is coupled to one input terminal of a video switch 70.

The output terminal of delay line 20 is coupled to the other input of summing amplifier 40. The output terminal of amplifier 40 is coupled, in turn, to one input of a second summing amplifier 60 and to the input terminal of a 280 nanosecond delay line 50, the output of which is coupled to the other input of summing amplifier 60. The output of amplifier 60 is coupled to the other input of video switch 70. Video switch 70 is of conventional design and operates, i.e., couples either input $S_N$ from delay line 30 or input $S_R$ from amplifier 60 to a common output terminal (Video Out), in response to a control signal from signal dropout detector 80. Signal dropout detector 80, also of conventional design, monitors the R.F. output signal (signal $I_N$) of the VTR, which is generally in the form of a frequency modulated signal bearing the image or video information. The detector 80 is responsive to a loss of R.F. rather than video information so as to distinguish between a true dropout and the varying video signal.

Figure 2:
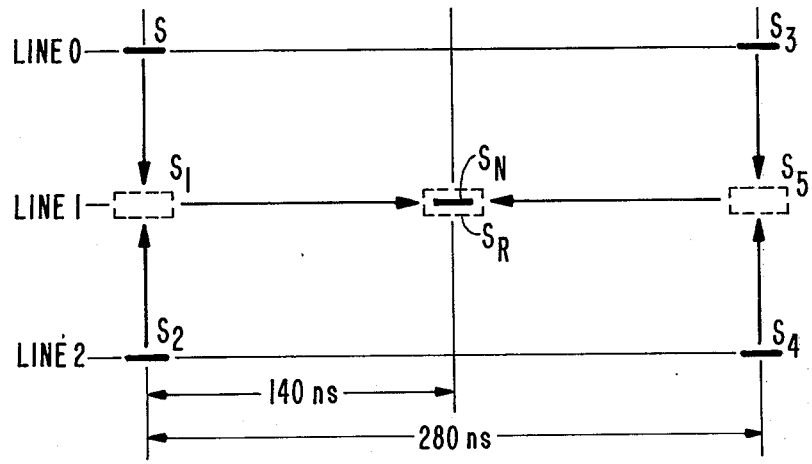
FIG. 2 is a graphical representation of the operation of the system of FIG. 1.

The operation of the circuit of FIG. 1 is as follows. Referring to the graphical illustration of FIG. 2, which illustrates any three successive lines of a television field identified as line 0, 1, 2, the incoming video signal shown in FIG. 2, as of an arbitrary length S, is delayed in delay line 10 by one television line which, in effect, displaces the signal segment to a position $S_1$. Although the video signals S, $S_1$, $S_N$, etc., are shown as segments of a TV line, it is understood that the video signal is a continuous signal and that FIG. 2 represents a moment of stopped time during which a dropout of duration equal to line segment S has occurred. The video signal is further delayed by delay line 30 by an additional 140 nanoseconds, which is equivalent to one-half cycle at a burst carrier frequency of 3.58 MHz in the NTSC system. The incoming video signal S delayed by one line ($S_1$) plus 140 nanoseconds yields video signal $S_N$, which is coupled through video switch 70 to the output terminal and, as such, is utilized as the normal video signal.

Simultaneously with the processing of the input video signal S to provide the video output signal from video switch 70, the once-delayed output of delay 10 is delayed yet another line, that is, from time position $S_1$ on line 1 to position $S_2$ on line 2. The original input signal S and twice-delayed input signal $S_2$ are coupled to summing amplifier 40, the output of which is $S_1'$ or the combined and weighted output of line segments S and $S_2$. The signal segment $S_1'$ is again summed with $S_1'$, delayed by 280 nanoseconds in delay line 50, so as to provide a combined and weighted line segment $S_R$ at the output of amplifier 60, which, as is illustrated, represents line segments S and $S_2$ delayed by 280 nonoseconds or one full cycle of subcarrier at 3.58 MHz. Therefore, the output of summing amplifier 60, which provides the replacement video segment to video switch 70, comprises one-quarter of S, $S_2$, $S_3$ and $S_4$. This weighted and delayed input video signal $S_R$, coupled to video switch 70, is identical in time and amplitude to the normal video signal input to video switch 70 and further represents a weighted average of the image information surrounding the point of interest (the dropout occurring during the line segment $S_N$) rather than a direct replacement of more or less redundant video image information from a previous line.

Thus, a replacement video signal is generated which more nearly represents the original video signal in terms of luminance and chroma content. This is of a particular performance advantage in regard to the luminance detail of the replacement video signal, as compared with the original luminance video signal detail since the replacement video signal comprises luminance detail information, which is the combination of the line before and the line after the line of interest. This averaging of luminance detail yields an improved video display in all modern television systems which utilize an interlaced television image field sequence since adjacent lines in any particular field are really displaced by two lines on the television display as a result of the field interlace.

Figure 5:
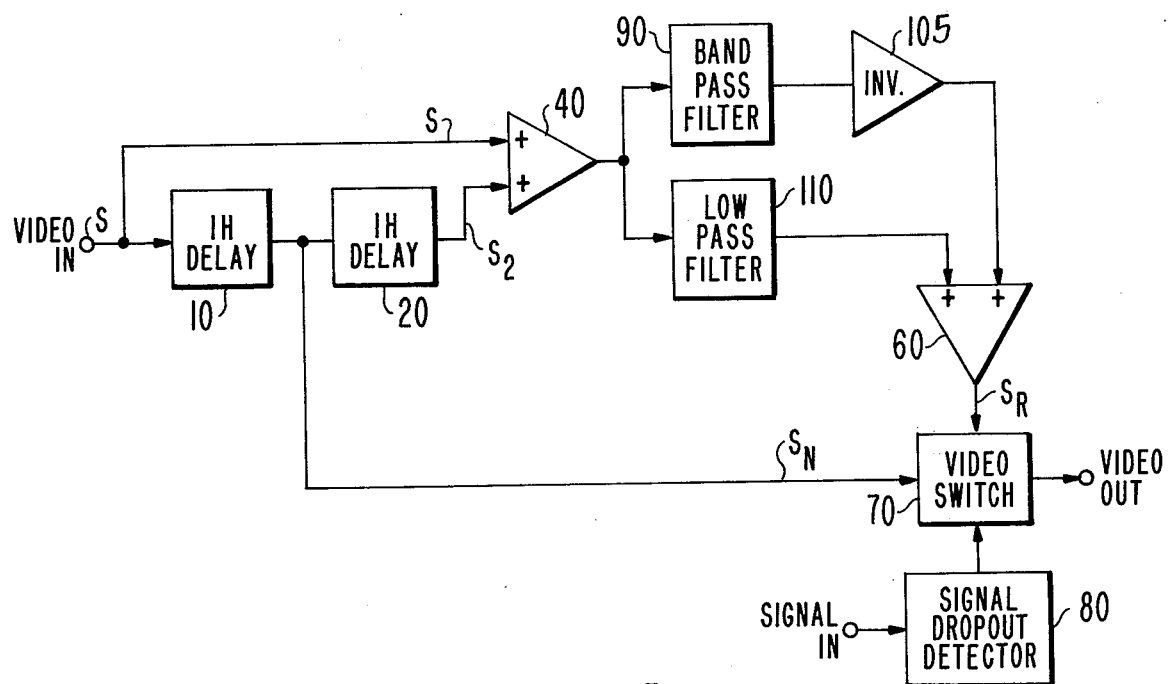
FIG. 5 is a block diagram of an alternate embodiment of an analog system embodying the present invention.
Figure 6:
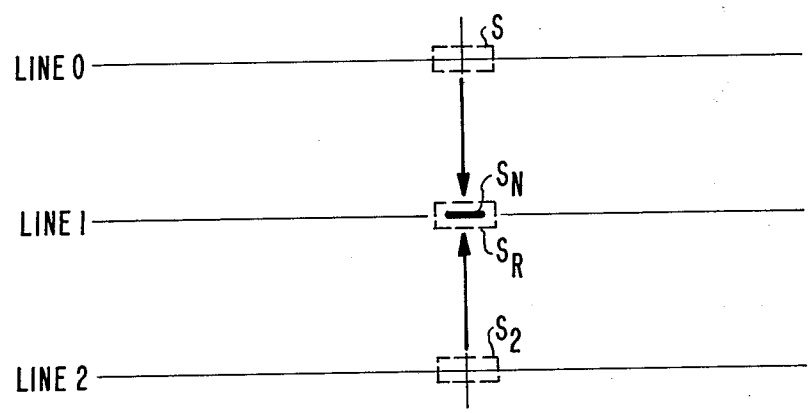
FIG. 6 is a graphical representation of the operation of the system of FIG. 5.

FIGS. 5 and 6 illustrate an alternate embodiment to the system of FIGS. 1 and 2 wherein the correct phasing of the chrominance portion of the replacement video signal is obtained by chroma signal inversion of one of the two signals making up the replacement video signal rather than by means of the delay devices 30 and 50 of the circuit of FIG. 1.

The operation of the circuit of FIG. 5 is as follows. Referring to the graphical illustration of FIG. 6, which illustrates any three successive lines of a television field identified as line 0, 1, 2, the incoming video signal, shown in FIG. 2, as of an arbitrary length S, is delayed in delay line 10 by one television line which, in effect, displaces the signal segment to a position $S_N$ on line 1. Video signal $S_N$ is coupled through video switch 70 to the output terminal and, as such, is utilized as the normal video signal.

Simultaneously with the processing of the input video signal S to provide the video output signal from video switch 70, the once-delayed output of delay line 10 is delayed yet another line in delay means 20 to provide a signal $S_2$. The original input signal S and twice-delayed signal $S_2$, which are in the correct subcarrier phase since they are on alternate television lines, are coupled to summing amplifier 40 wherein the signals $S_1$ and $S_2$ are combined and weighted to yield at the output of amplifier 40 a signal which is equal to the required replacement for signal segment $S_N$ in amplitude, but not in chroma phase since adjacent lines have a subcarrier burst which, in the NTSC system, differs from line to line by 180° of subcarrier frequency. To obtain the correct chroma phase, the output signal from summing amplifier 40 is coupled to a low pass filter 110 wherein the luminance portion of the signal from 0 to 2 MHz is separated into a luminance signal component; and to a bandpass filter 90 wherein the chroma portion of the signal from 2 to 4 MHz is separated into a chroma signal component. The chroma signal component is, in turn, coupled to an inverter 105, the output of which is the chroma signal component inverted in phase. The luminance signal component output of low pass filter 110 and the inverted chroma signal component output of inverter 105 are coupled to the input terminals of a summing amplifier 60, the output of which provides the replacement video segment to video switch 70 in the form of one-half of S and $S_2$ with the chroma portion inverted. This weighted and inverted input video signal $S_R$, coupled to video switch 70, is identical in time and amplitude to the normal video signal input to video switch 70 and represents a weighted average of the image information both before and after the point of interest (the dropout occurring during the line segment $S_N$) rather than a direct replacement of more or less redundant video information from the previous line above.

Figure 3:
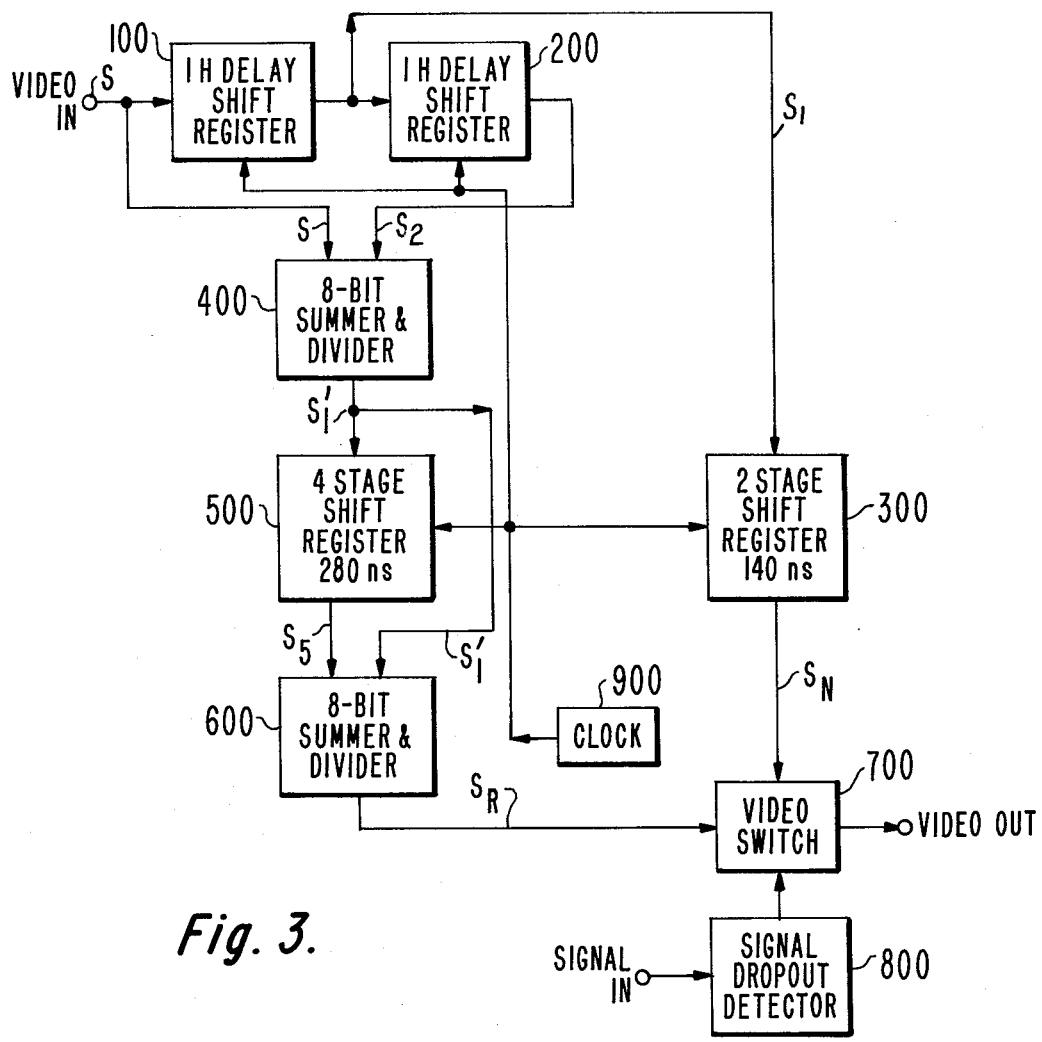
FIG. 3 is a block diagram of a digital system embodying the present invention.

FIG. 3 further illustrates the present invention in a digital television signal processing system which utilizes conventional shift registers to obtain the signal delays afforded by the glass delay lines of FIG. 1. In FIG. 3, the reference numerals generally correspond to the reference numerals of FIG. 1, wherein, for example, the 1H delay shift register 100 of FIG. 3 corresponds to the 1H glass delay line 10 of FIG. 1. Similarly, the 200 to 800 reference numerals identify corresponding functions of FIG. 1 identified by reference numerals 20 to 80.

In FIG. 3, the video input signal S represents video image information, which has been processed into a digital format, for example, by means of an analog to digital (A/D) conversion (not shown) at a typical clock rate of 14.32 MHz (four times the subcarrier frequency of 3.58 MHz) or approximately 70 nanosecond sample time using an 8 bit binary digital representation of the magnitude of each sample taken at the clock rate. Therefore, the video input signal S to 1H delay 100 is an 8 bit digital word; and since clock 900, which is coupled to shift register 100, is operated at four times the subcarrier frequency, the 1H delay line shift register 100 comprises 910 stages, times 8 bits per word, so as to provide a signal delay between the input and output terminals of shift register 100 of 910 × (1/4 × Subcarrier) nanoseconds for a total delay time of 63.5 microseconds, which is equivalent to one horizontal television line of delay. In similar fashion, four stage shift register 500 and two stage shift register 300 clocked at the clock rate of 14.32 MHz yield, respectively, 280 (4 × 70 nanoseconds) and 140 (2 × 70 nanoseconds) of delay to a signal between their input and output terminals.

Figure 4:
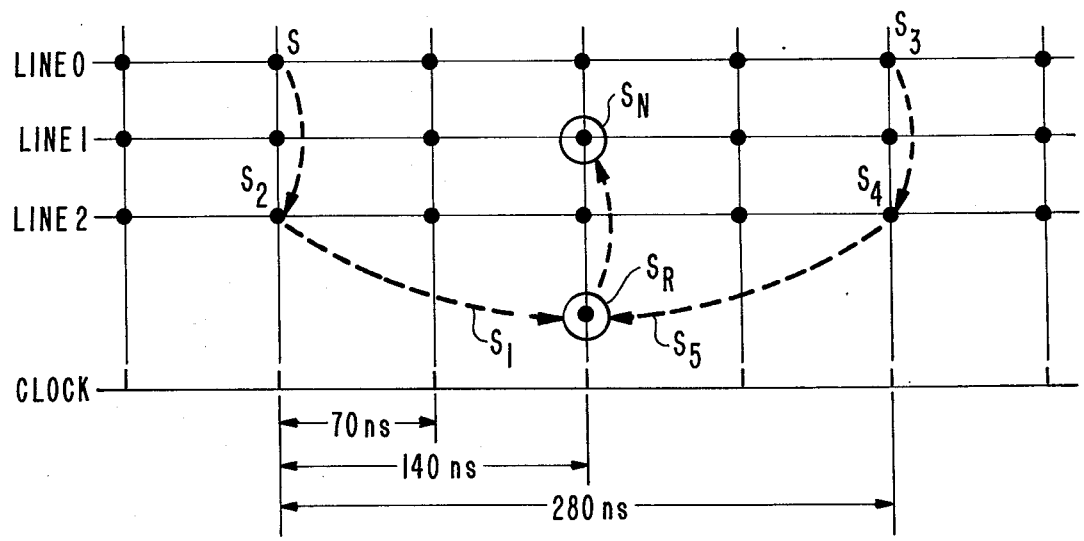
FIG. 4 is a graphical representation of the operation of the system of FIG. 3.

The operation of the circuit of FIG. 3 is as follows. Referring to FIG. 4, which is a graphical representation of any three successive television lines of a given field identified by lines 0, 1, 2, the dots representing digital samples of the video image information taken at the clock rate of four times subcarrier or, as illustrated in FIG. 4, at a sampling time interval of 70 nanoseconds. Although the video signal in FIG. 4 is shown as comprising fixed samples at a moment of stopped time, it is understood that the video signal is a continuous stream of digitized data points under influence of clock 900 of FIG. 3.

The digitized input video signal S coupled to the input terminal of 1H delay 100, which delays the input signal by one line, that is, from location S on line 0 to the same location on line 1. This signal is further delayed 140 nanoseconds by shift register 300, which places the input signal two clock pulses to the right at location $S_N$ on line 1; thus, the input video signal S has been delayed one line plus 140 nanoseconds, as in the apparatus of FIG. 1, to yield the normal video output signal $S_N$ coupled to one input of video switch 700. In the absence of a dropout control signal to video switch 700, video switch $S_N$ appears at the video output terminal of video switch 700, still in digital form for any further desired processing prior to reconverting (D/A) the signal to analog form for reproduction in a television receiver or other reproducing means.

Simultaneously with the processing of the input signal to provide the normal video output signal $S_N$ from video switch 700, the once-delayed signal from the output terminal of delay 100 is coupled to delay 200 to obtain a twice-delayed signal sample, which is shown in FIG. 4 as being located at position $S_2$. The original signal S and twice-delayed $S_2$ are combined in an 8 bit summer/divider 400, where the signals are combined and divided to yield a weighted average of the signal at the line before (0) and the line after (2) the line of interest (1). As in FIG. 3, the combined signal $S_1'$, delayed by 280 nanoseconds in shift register delay 500 to provide $S_5$ is recombined and weighted with $S_1'$ in 8 bit summer/divider 600 to yield a replacement video signal $S_R$. Therefore, the output signal $S_R$ of 8 bit summer/divider 600 comprises one-quarter of S, $S_2$, $S_3$, and $S_4$. This weighted and delayed input video signal $S_R$, coupled to video switch 700, is identical in time and amplitude to the normal video signal input $S_N$, coupled to video switch 70, and further represents a weighted average of the image information surrounding the point of interest (the dropout occurring at a time corresponding to sample $S_N$) rather than a direct replacement of a more or less redundant sample of video from the previous line. Therefore, a replacement video signal is generated in digital format having all the advantages of the analog format described in conjunction with FIGS. 1 and 3.

Although the present invention has been described in terms of an NTSC television system standard, the principles of the invention are equally applicable to other television standards. These other standards do contain differences from the NTSC system which require modification to the delay times and clock rates described in conjunction with FIGS. 1 and 4 among these are: the clock frequency which determines the number of samples per line, i.e., 4.33 MHz in PAL, versus 3.58 MHz in NTSC as well as the delay time for the one-half and full cycle of burst subcarrier. Similarly, in the PAL system, the phase alternation that occurs from line to line requires that the image information for generating the replacement video be taken two lines before and two lines after the line of interest where the dropout may occur.

What is claimed is:

1. A video signal processing system for providing dropout compensation for a color video signal by substituting a replacement color signal for the color video signal during the period of the dropout, said replacement signal consisting of video information from the television lines before and after said dropout, said system comprising:

a source of video signals;

first delay means responsive to said video signals for delaying said video signals by at least one television line to provide a first information signal;

second delay means coupled to said first delay means, said first and second delay means responsive to said video signals for delaying said video signals by at least two television lines to provide a second information signal;

first combining means responsive to said video signals and said second information signal to provide a third information signal at a line time intermediate said video signals and said second information signals;

signal processing means responsive to said third information signal for developing a replacement signal equal in subcarrier phasing to said first information signal; and switch means coupled to said first information signal and said replacement signal being responsive to a dropout signal for substituting one of said first information signal or said second video output signals for the other in the presence of said dropout signal.

2. A video signal processing system for providing dropout compensation for a color video signal by substituting a replacement color signal for the color video signal during the period of the dropout, said replacement signal consisting of video information from the television lines before and after said dropout, said system comprising:

a source of video signals;

first delay means responsive to said video signals for delaying said video signals by at least one television line to provide a first information signal;

second delay means coupled to said first delay means, said first and second delay means responsive to said video signals for delaying said video signals by at least two television lines to provide a second information signal;

first combining means responsive to said video signals and said second information signal to provide a third information signal at a line time intermediate said video signals and said second information signals;

means responsive to said third information signal for separating the luminance and chrominance portions of said third information signal;

means for inverting said separated chrominance portion of said third information signal;

means for recombining said separated luminance and said inverted chrominance portions of said third information signal to provide a second video output signal, said second video signal coinciding in time and color subcarrier phase with said first information signal; and switch means coupled to said first information signal and said second video output signal being responsive to a dropout signal for substituting one of said first information or said second video output signals for the other in the presence of said dropout signal 3. A video signal processing system for providing dropout compensation for a color video signal by substituting a replacement color signal for the color video signal during the period of the dropout, said replacement signal consisting of video information from the television lines before and after said dropout, said system comprising:

a source of video signals;

first delay means responsive to said video signals for delaying said video signals by at least one television line to provide a first information signal;

second delay means coupled to said first delay means, said first and second delay means responsive to said video signals for delaying said video signals by at least two television lines to provide a second information signal;

third delay means responsive to said first information signal for delaying said first information signal by an additional delay period of one-half cycle of the color subcarrier to provide a first video output signal;

first combining means responsive to said video signals and said second information signal to provide a third information signal at a line time intermediate said video signals and said second information signals and one-half cycle of color subcarrier in advance of said first video output signal;

fourth delay means responsive to said third information signal for delaying said third information signal by an additional delay of one full cycle of color subcarrier to provide a fourth information signal;

second combining means responsive to said third information signal and said fourth information signal to provide a second video output signal, said second video signal coinciding in color subcarrier phase with said first video output signal; and switch means coupled to said first and second video output signals being responsive to a dropout signal for substituting one of said first or said second video output signals for the other in the presence of said dropout signal.

* * * * *